United States Patent
Mahr et al.

(10) Patent No.: US 10,131,389 B1
(45) Date of Patent: Nov. 20, 2018

(54) AUTOMATED GUIDED CART INDEPENDENT SECURING DEVICE

(71) Applicant: Toyota Motor Engineering & Manufacturing North America, Inc., Erlanger, KY (US)

(72) Inventors: Brandon O. Mahr, Rutland, OH (US); Nicholas P. Amandus, Charleston, WV (US); David W. Newberry, Gallipolis, OH (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/498,974

(22) Filed: Apr. 27, 2017

(51) Int. Cl.
  *B62D 65/02* (2006.01)
  *B25J 5/02* (2006.01)
  *B62D 65/10* (2006.01)

(52) U.S. Cl.
  CPC .............. *B62D 65/022* (2013.01); *B25J 5/02* (2013.01); *B62D 65/10* (2013.01); *G05B 2219/50393* (2013.01)

(58) Field of Classification Search
  CPC .......... B65D 65/022; B65D 65/10; B25J 5/02; B66F 7/0625; B25B 11/00; B25B 1/00; B23Q 3/06; B23Q 3/00; B23Q 3/066
  USPC .............. 410/77, 80; 269/43, 254 CS, 289 R
  See application file for complete search history.

(56) References Cited

U.S. PATENT DOCUMENTS

| | | | |
|---|---|---|---|
| 4,777,783 A * | 10/1988 | Zald ...................... | B06B 1/0611 414/795.3 |
| 5,506,512 A | 4/1996 | Tozawa et al. | |
| 6,112,858 A * | 9/2000 | Arnst .................... | B66F 7/0625 104/44 |
| 6,799,521 B2 | 10/2004 | Tai et al. | |
| 7,008,164 B2 * | 3/2006 | Rokkaku ............. | B60L 11/1805 198/370.01 |
| 7,416,196 B2 | 8/2008 | Brown | |
| 9,309,008 B2 * | 4/2016 | Boulanger ........... | B64F 5/0036 |
| 9,420,900 B1 | 8/2016 | Simpson et al. | |
| 9,889,787 B2 * | 2/2018 | Thomas ................... | B60P 3/07 |
| 2004/0108494 A1 * | 6/2004 | Garrelts ............... | B66F 7/0625 254/8 B |

FOREIGN PATENT DOCUMENTS

| CN | 105502210 A | 4/2016 |
|---|---|---|
| JP | 2013103549 A | 5/2013 |
| JP | 2013129508 A | 7/2013 |

* cited by examiner

*Primary Examiner* — Kaitlin S Joerger
(74) *Attorney, Agent, or Firm* — Dinsmore & Shohl LLP

(57) ABSTRACT

A workpiece transport assembly, a material handling assembly and a method of operating a cart within a material handling environment. An automated guided cart includes two independently-operable workpiece-securing devices to selectively permit retention of a workpiece or a workpiece-holding pallet while disposed on a mounting surface of the cart. The second workpiece-securing device is mounted to the cart in such a way as to be cooperative with the mounting surface to selectively permit workpiece or pallet retention regardless of whether the first workpiece-securing device is securing the workpiece to the cart. The second workpiece-securing device may be actuated either manually by operational personnel or automatically by controller or in response to movement by a cooperating conveyor.

20 Claims, 4 Drawing Sheets

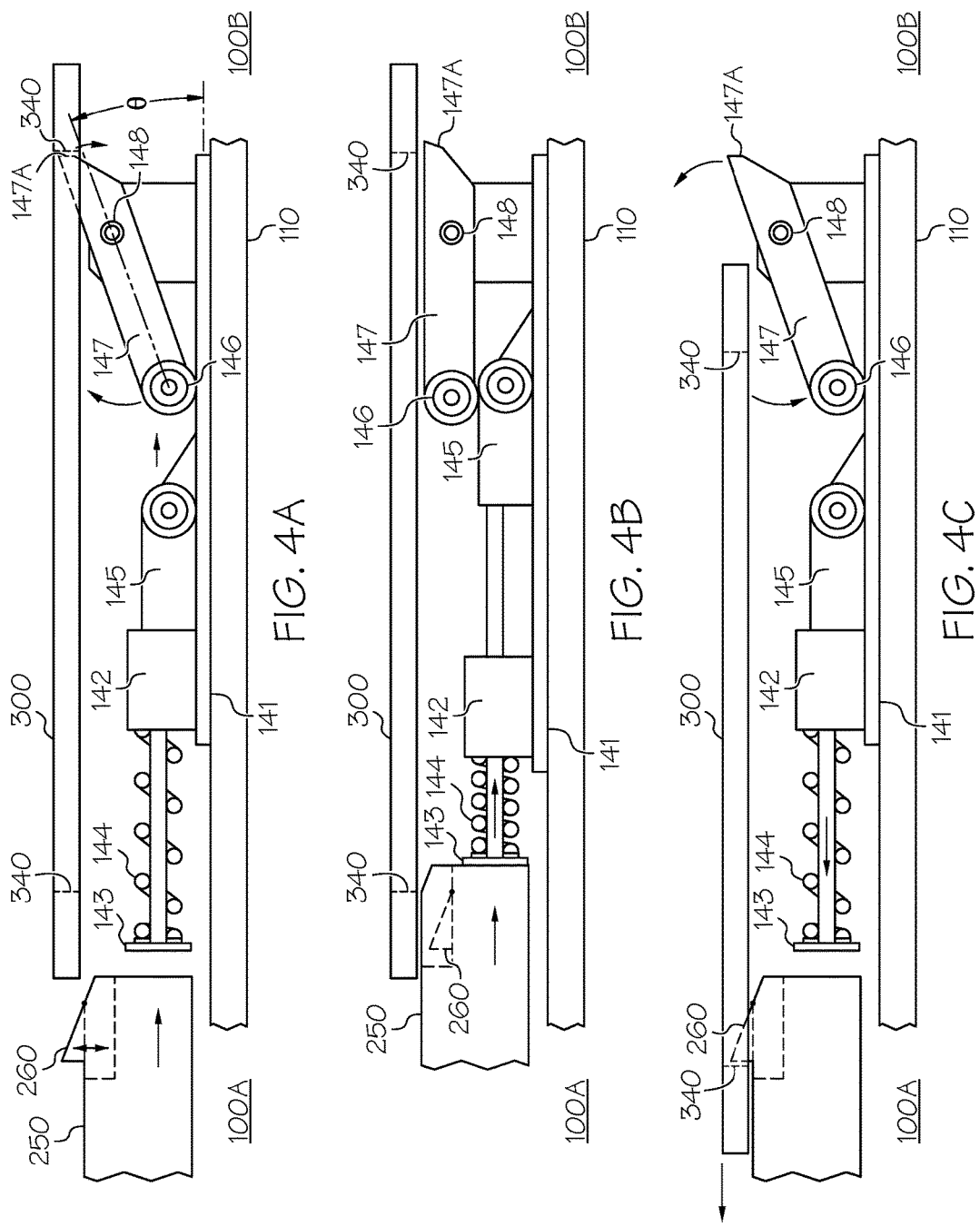

AUTOMATED GUIDED CART INDEPENDENT SECURING DEVICE

TECHNICAL FIELD

The present specification relates generally to the use of automated guided carts (AGCs) for material handling operations, and more particularly to an AGC-mounted device that provides an independent way to prevent the inadvertent or premature release of a workpiece that is placed on the AGC.

BACKGROUND

AGCs—which are typically smaller versions of automated guided vehicles (AGVs)—are mobile robotic devices used as material movers in manufacturing facilities, warehouses and related industrial applications. In a typical configuration such as that found in an automobile production facility, one or more AGCs are used to move a workpiece being assembled between numerous assembly lines, assembly stations or the like. In one particular mode of operation, the AGC is moved around the factory floor between the various stations or lines until it comes to a rest at a spot adjacent a conveyor, workspace or other staging area where a part, component or related workpiece being transported can be loaded onto or off the AGC, depending on the need.

It is important that the workpiece remain in its intended location while situated on the AGC. Current ways to promote such part retention is by use of a rigid retaining or stopping member that may selectively provide an impediment to inadvertent movement of the workpiece from the top of the AGC; in one form, such a member operates by pivoting a rotatably movable bar or related gate in what is sometimes referred to as a "swing stop". While the swing stop or related retention device works well for its intended purpose, its use is limited to one side of the AGC. Moreover, should the swing stop fail to close (that is to say, move into a securing position), a pallet disposed on top of the AGC is unsecured, and as such is under an increased risk of falling off the AGC, leading to harm to personnel or damage to one or more of the workpiece, the AGC and adjacent material-handling equipment on the factory floor 1.

The author of the present disclosure has determined that there is a need for a redundant and independently-operated workpiece-securing device for AGCs.

SUMMARY

In one embodiment, a workpiece transport assembly is disclosed. The assembly includes an AGC with a motorized chassis and a workpiece-receiving surface disposed thereon. Two independently-operable workpiece-securing devices are mounted to the AGC and cooperative with the workpiece-receiving surface to selectively permit retention of a workpiece disposed on the AGC's mounting surface. The second workpiece-securing device is mounted to the AGC in such a way as to be cooperative with the mounting surface to selectively permit a second retention of the workpiece regardless of whether the first workpiece-securing device is securing the workpiece to the AGC.

In another embodiment, a material handling assembly is disclosed. The assembly includes a conveyor with a proximal end and a distal end such that a workpiece disposed on a surface of the conveyor is transported between the proximal and distal ends, and a workpiece transport assembly configured in a manner that is substantially similar to that of the workpiece transport assembly of the previous embodiment. Within the present context, the proximal and distal ends of the conveyor need not necessarily correspond to opposing ends, but may also include intermediate locations that are respectively nearer and farther from the AGC when the conveyor and AGC are placed adjacent one another for the purpose of workpiece loading or unloading.

In yet another embodiment, a method of operating a cart within a material handling environment is disclosed. The method includes placing the cart adjacent a conveyor, moving a workpiece that is situated on one of the cart and conveyor to the other of the cart and conveyor, and operating the second workpiece-securing device such that selectively retains the workpiece on the workpiece-receiving surface independently of the first workpiece-securing device. The cart includes a first workpiece-securing device and a second workpiece-securing device both of which are mounted to the cart and are cooperative with a workpiece-receiving surface disposed on the cart.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 4A through 4C depict a sequence showing cooperation between the second workpiece-securing device of FIG. 3 and a pallet that is situated on the AGC in accordance with one or more embodiments shown or described herein.

DETAILED DESCRIPTION

Embodiments disclosed herein help ensure the safe transfer of a workpiece that is being transported via AGC by providing a second independently operable retention or securing device. This second retention device allows for a continuous (i.e., full time) retention to hold the workpiece in its intended location on the AGC until either a manual operator-initiated or automated machine-initiated override is employed. In one form, the second retention device is configured as an assembly mountable onto the AGC. Such assembly may include a spring-biased, movable shaft coupled to a wedge such that a pivoting or otherwise rotatable lever can be moved in or out of engagement with a workpiece or pallet that can be placed on or removed from the AGC. In one form, such engagement may be effected by an interference fit between the lever and a corresponding surface of the pallet or workpiece.

Figure 1:
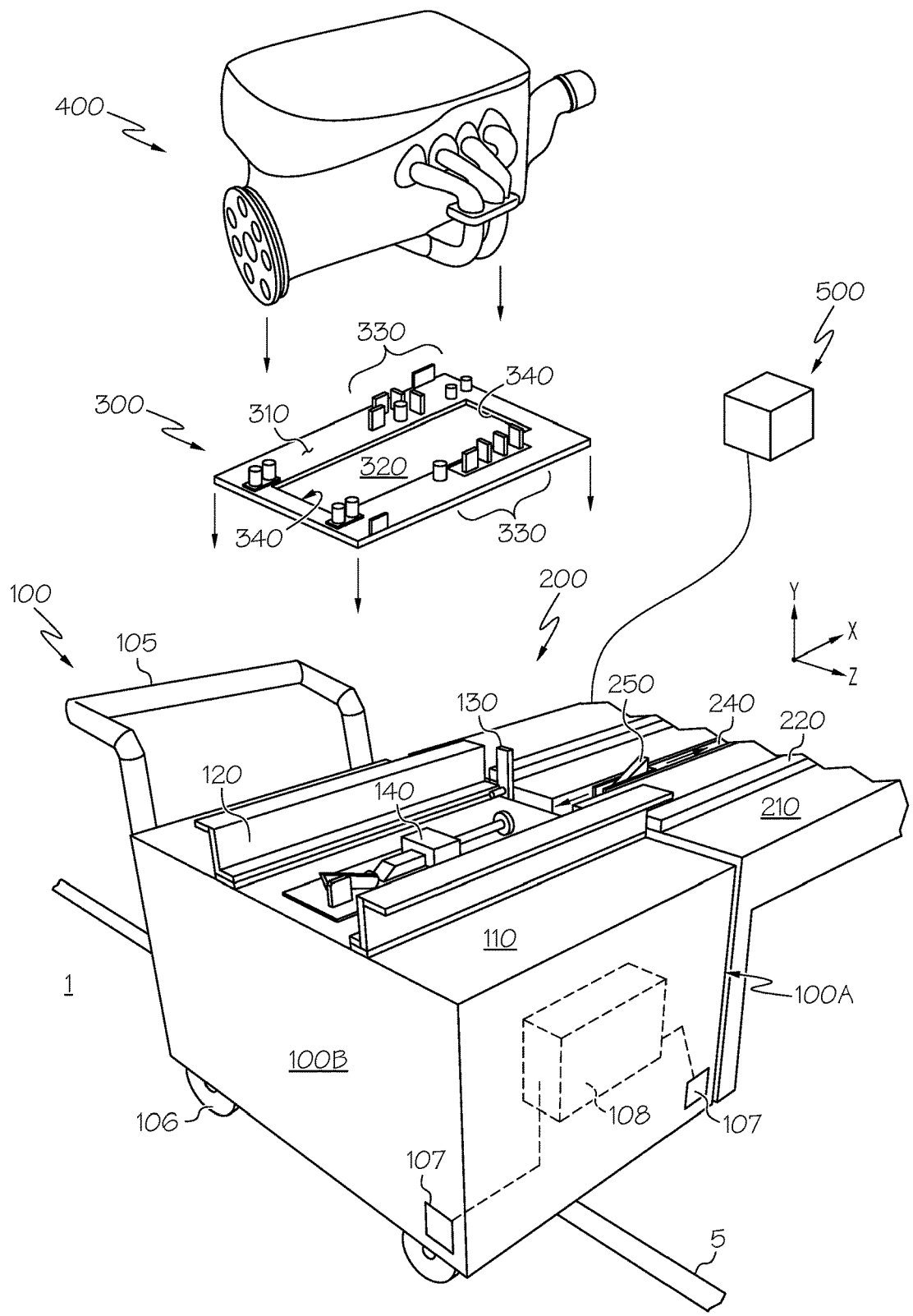
FIG. 1 depicts an AGC placed adjacent a conveyor in accordance with one or more embodiments shown or described herein.

Referring first to FIG. 1, an AGC 100 is shown stopped adjacent the end of a conveyor belt 200, both situated on a factory floor 1 or related workspace. Within the present context, the term "factory floor" and its variants is meant to be the equivalent of any material handling environment where either the assembly or transport of a manufactured article takes place between one or more stations within an environment typically associated with AGC 100 use. As such, in addition to factories, shops and related manufacturing facilities, warehouses and related storage environments used for staging or display of the manufactured article or related inventory are deemed to be within the scope of such term. Movement of AGC 100 about the factory floor 1 may be through motive power provided by one or more electric motors (not shown) that are mounted within the wheeled chassis, while fine-tuned position adjustment may be effected through manual pushing or pulling through handle 105. Moreover, the AGC 100 may use various forms of a guidance system, such as laser, inertial, wire, floor-mounted magnetic tape 5, rails or the like. In one form, some or all of wheels 106 may be steerable so that such a guidance system that uses sensors 107 and a control unit 108 to provide forward, rearward and sideways direction sensing and regulation of steerable wheel 106 movement through the electric motor can ensure that the AGC 100 follows the prescribed path. In one form, the guidance system can provide independent operation of each steering motor that is separately dedicated to a respective wheel 106 in order to enable each wheel 106 to independently follow the prescribed path. In one form, such movement and guidance facilitates the delivery of pallets and workpieces (for example, an assembled internal combustion engine (ICE) 400 or the like) disposed thereon between various stations or other parts of the factory floor 1. In the form shown, the AGC 100 is sized and shaped as a cart. In another form, AGC 100 may be configured as a forklift, while in yet another form, the AGC 100 may be configured as one or more carts being pulled by a tow motor.

The sensor or sensors 107 may acquire a signal that is indicative of proximity between the AGC 100 and conveyor 200 or other adjacent objects that may be situated on the factory floor 1. Although shown notionally on the front and one side of AGC 100, it will be appreciated that sensor 107 may be mounted on any suitable rigid location to allow it to be in a signal-receiving position relative to the conveyor 200 or other adjacent objects. Although not shown, the sensor 107 may be placed within a ruggedized structure in or around the AGC 100 to help protect the sensor 107 from being damaged, so long as such structure does not interfere with the ability of the sensor 107 to send or receive signals S. In one form, the sensor or sensors 107 may include one or more of an ultrasonic detector, audio detector, infrared detector, microwave detector, camera and lidar detector in order to detect radiation in any desirable wavelength band, such as the ultraviolet wavelength band, the near-ultraviolet wavelength band, the visible light wavelength band, the microwave band, as well as various infrared (IR) wavelength bands, including near-infrared, infrared or far-infrared band. In one form, these sensors 107 may interact with the control unit 108 through suitable interaction or coupling hardware, such as amplifiers, drivers, digital-to-analog converters, analog-to-digital converters or the like.

As shown, AGC 100 may be moved up against a termination point for a conveyor 200 or other workpiece-handling equipment to promote the relatively smooth loading or unloading of the pallet and accompanying workpiece between the upper surface 110 of the AGC 100 and the upper surface 210 of conveyor 200. Spaced guide rails 120 and 220 formed on the respective upper surfaces 110, 210 are secured (such as by fasteners or the like) to provide a travel path for a pallet 300 that may be used to provide a mounting surface 310 for the ICE 400. In one form, the generally rectangular shape resembles a picture frame where an aperture 320 formed in the mounting surface 310 may be used to provide selective engagement with first and second workpiece-securing devices 130, 140. The size and shape of the pallet 300 is tailored to provide a secure attachment to various discreet (typically lower) surfaces on the ICE 400, and as such in one form becomes the equivalent of specialty tooling for a particular make or model of ICE 400 or other workpiece. The mounting surface 310 may include various rigid cylindrical, rectangular or other-shaped upstanding members 330 with which to engage the corresponding rigid surface of the ICE 400. In such circumstance, the lateral and longitudinal dimensions (associated with the X-axis and Z-axis of the Cartesian coordinate system shown) of the pallet 300 are approximately the same as that of the sets of guide rails 120, 120 that are used to facilitate the transfer of the pallet 300 between the AGC 100 and the conveyor 200. Within the present context, the X-axis defines a loading axis of the workpiece (i.e., ICE 400) as its movement extends between the AGC 100 and conveyor 200.

In loading operations, because of the size and weight of the ICE 400 (typically between about 300 pounds and 500 pounds for conventional passenger vehicles) or related workpiece placed on the pallet 300, it may be difficult for an operator (in manual loading and unloading scenarios) or a conveyor (in automated or semi-automated scenarios) to properly place the pallet 300 on the upper surface 110 of AGC 100, even with the use of the guide rails 120 as a mounting pathway. Moreover, the relative speed with which the pallets 300 and the ICE 400 or related workpiece are conveyed between the AGC 100 and conveyor 200 may compound this difficulty. Furthermore, the pallets 300 are often in need of reorientation (such as by forklift or the like) when being conveyed between the conveyor 200 and the AGC 100, where it will be appreciated that such reorientation may be used to promote ease of workpiece assembly operations or the like. Because of this, the AGC 100 includes the first and second workpiece-securing devices 130, 140 as a way to provide additional retention for the ICE 400 or other workpiece placed on AGC 100. In one form as shown, the first and second workpiece-securing devices 130, 140 are disposed such that the first workpiece-securing device is sized and placed to prevent inadvertent release of the ICE 400 or other workpiece from a side 100A of the AGC 100 that is configured to substantially abut the proximal end of conveyor 200, while the second workpiece-securing device 140 is sized and placed to prevent inadvertent release of the ICE 400 or other workpiece from a substantially opposing side of the AGC 100. Each of these securing devices 130, 140 will be discussed in more detail in conjunction with respective FIGS. 2 and 3.

A controller 500 may be used to regulate automated operation of one or more of the second workpiece-securing device 140 and a conveyor-mounted actuator 250 that will be discussed in more detail in conjunction with FIGS. 4A through 4C. In one form, the controller 500 may be in the form of a programmable logic controller (PLC) that can be specifically adapted to provide reliable operation in harsh vibratory and thermal environments, such as those associated with conveyor 200. Regardless of whether configured as a PLC, controller 500 may function as a computer so that automated operation associated with workpiece loading from or delivering to the AGC 100 takes place through control logic, program code or a related algorithm in the form of computer-executable (i.e., machine-readable) instructions that can be performed, run or otherwise conducted on the controller 500. Such computer-executable instructions may be written in any programming language, including machine language that may be directly executed by a processor as discussed below, assembly language, object-oriented programming (OOP) language, scripting languages, microcode or the like that may be compiled or assembled and stored in memory as discussed below. Alternatively, the machine readable instructions may be written in a hardware description language (HDL), such as logic implemented via either a field-programmable gate array (FPGA) configuration or an application-specific integrated circuit (ASIC), as well as their equivalents. As such, the system and methods described herein may be implemented in any conventional computer programming language, as pre-programmed hardware elements, or as a combination of hardware and software components.

In one form, the controller 500 may be configured to include one or more of an input and output (I/O), a processing unit (often referred to as a central processing unit (CPU) or more generally as a processor) and memory the last of which can temporarily or permanently store such a code, program or algorithm such that the instructions contained in the code are operated upon by the processing unit based on input data received by I/O such that output data generated by the code and the processing unit can be conveyed to another program or a user via I/O. It will be appreciated that instead of a single CPU, the processing unit may be in the form of numerous distributed microprocessors or related processing means, and that either variant is deemed to be within the scope of the present disclosure as long as they are capable of executing the machine-readable versions of the control logic, program code or related algorithm. In one form, a data-containing portion of the memory—also associated with volatile working memory—is referred to as random access memory (RAM), while an instruction-containing portion of the memory—also associated with permanent or non-volatile memory—is referred to as read only memory (ROM). Thus, it will be appreciated by those skilled in the art that computer-executable instructions can be placed within an appropriate location (such as the aforementioned memory) within controller 500 in order to achieve the objectives set forth in the present disclosure. In one form, the controller 500 may additionally include additional chipsets (not shown) for peripheral functions. In addition to the control logic, program code or related algorithm, memory may be configured to store object detection logic, object recognition logic, as well as auditory or visual indicia-generation logic, all as described in more detail elsewhere in this disclosure.

Such a controller 500 as discussed herein is generally referred to as having a von Neumann architecture, and is configured to perform the specific automated steps outlined in this disclosure. Upon having the program code means loaded into memory in general (and in one form into ROM in particular), controller 500 becomes a specific-purpose machine configured to determine the parameters associated with the operational status of the AGC 100 and conveyor 200 in a manner as described herein. As such, controller 500 becomes a particularly-adapted computer or computer-related data processing device that employs the salient features of such an architecture in order to perform at least some of the data acquisition, manipulation or related computational functions discussed herein. As shown, controller 500 depicts an autonomous (i.e., stand-alone) unit; as will be appreciated by those skilled in the art, in one form it may be the part of a larger network such as those encountered in cloud computing, where various computation, software, data access and storage services may reside in disparate physical locations. Thus, in one form (not shown), various components of the controller 500 may be distributed such that some are located on-board the AGC 100, while others are located in, on or around conveyor 200. Such a dissociation of the computational resources does not detract from such a controller 500 and associated components being within the scope of the present disclosure.

A data bus or related set of wires forms a suitable data communication path that can act as a local interface for the I/O, processing unit and memory, as well as any peripheral equipment in such a way as to permit the controller 500 to operate as an integrated whole. The bus may form part of the circuitry and be configured to include control, address and data features, and can be arranged in any conventional format, including controller area network (CAN), local interconnect network (LIN) and related variants. Likewise, a communication path formed by circuitry may signally couple any number of components to one another, regardless of whether they operate in a distributed or stand-alone computing environment. In one form, other devices may be coupled to the I/O (either through the bus or directly), while in another form, such devices may make up the I/O, depending on the degree of structural integration where with higher levels of such degree, component redundancy may be reduced or avoided.

In one form, the controller 500 cooperates with the conveyor 200 to not only translate ICE 400 (either with or without pallet 300) or related articles of manufacture or inventory to and from the AGC 100, but also to ensure proper coordination movement of actuator 250 and one or both of pallet 300 and ICE 400. In another form, the cooperation between the conveyor 200, its actuator 250 and upper surface 210 with that of the upper surface 110 of AGC 100 may be effected by mechanical means, where the rollers, belts or other surfaces (any of which are shown generally as part of upper surface 210) or related workpiece-conveying components disposed on the upper surface 210 of conveyor 200 are either cooperatively coupled (such as through gears, belts, pulleys and related equipment, none of which are shown) or configured to be sloped in such a way to take advantage of gravity—at least in one conveying direction of the workpiece along the loading axis of the workpiece to assist in its movement. In one form, guide rails 220 may be formed on the upper surface 210 of the conveyor 200 to help keep the workpiece that traverses the conveyor between its proximal and distal ends from sliding or otherwise falling laterally off the side of conveyor 200. Although not shown, sensors generally similar to sensors 107 may be situated in or around conveyor 200 in order to detect situations where the workpiece may be out of position relative to the rollers, belts or other conveying components that are disposed on—or make up a portion of—upper surface 210 of the conveyor 200; such sensors may be signally coupled to controller 500 in order to provide warnings that a workpiece is out of position, as well as corrective measures (for example, slowing or stopping the travel of one or more workpieces on conveyor 200). By way of example, such sensors may be configured as one or more of the ultrasonic, audio, infrared, microwave, camera or lidar detectors discussed previously, or may also include weight or load-based sensors placed in such a way to help indicate whether and ICE 400 or other workpiece is correctly or incorrectly situated on one or both of AGC 100 and conveyor 200.

Figure 2:
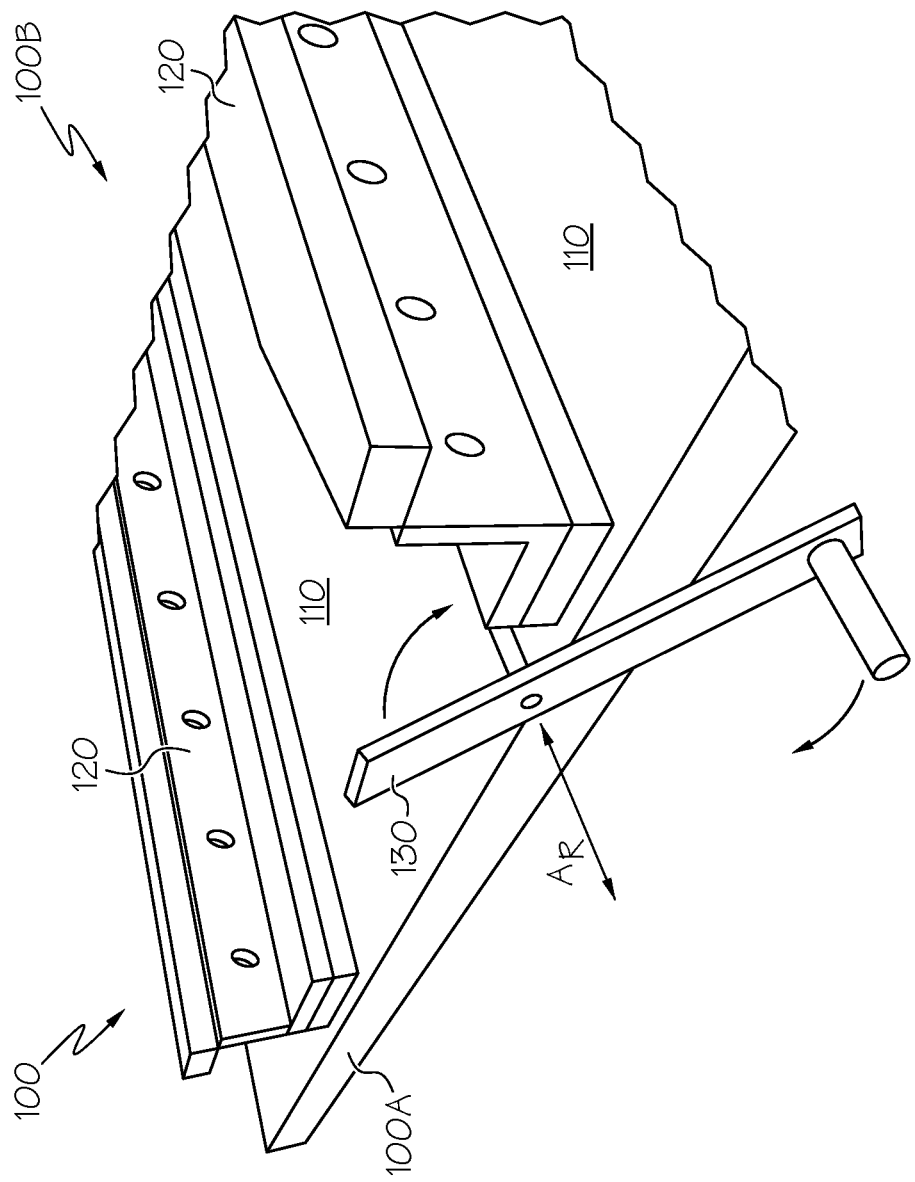
FIG. 2 depicts a first workpiece-securing device mounted to one side of the AGC of FIG. 1.

Referring next to FIG. 2, details of the first workpiece-securing device 130 are shown. In one form, the first workpiece-securing device 130 is a pivotably-mounted lever (also referred to herein as a swing stop) that is secured to the guide rails 120 or other suitable rigid location on the upper surface 110 of AGC 100. Furthermore, the first workpiece-securing device 130 is robust enough to provide restraint against inadvertent movement of the pallet 300 and workpiece once placed on the upper surface 110 of AGC 100. In one form, the first workpiece-securing device 130 is made from a relatively thick piece of structurally rigid material such as steel. Such construction helps promote resistance to deformation under load, as well as to inadvertent sliding or related movement of the pallet 300 or ICE 400. In one form, the first workpiece-securing device 130 can be made to pivot about an axis of rotation $A_R$ that is substantially orthogonal to a direction of movement of the AGC 100 when approaching and departing a conveyor 200 termination point along a guidance path that aligns with magnetic tape 5. In the form shown, the axis of rotation $A_R$ of the first workpiece-securing device 130 is substantially parallel to the loading axis of the ICE 400 of FIG. 1 as its movement extends between the AGC 100 and conveyor 200. In one form, the guide rails 120 are sized and laterally spaced from one another on the upper surface 110 along a substantial width of AGC 100 from one side 100A to the opposing side 100B. Moreover, the sizing and spacing of the guide rails 120 is such that a pallet 300 may fit between them. In addition, the relatively parallel construction and generally smooth surface finish of the guide rails 120 facilitate selective slidable movement of the pallet 300 along the loading axis of the ICE 400.

Figure 3:
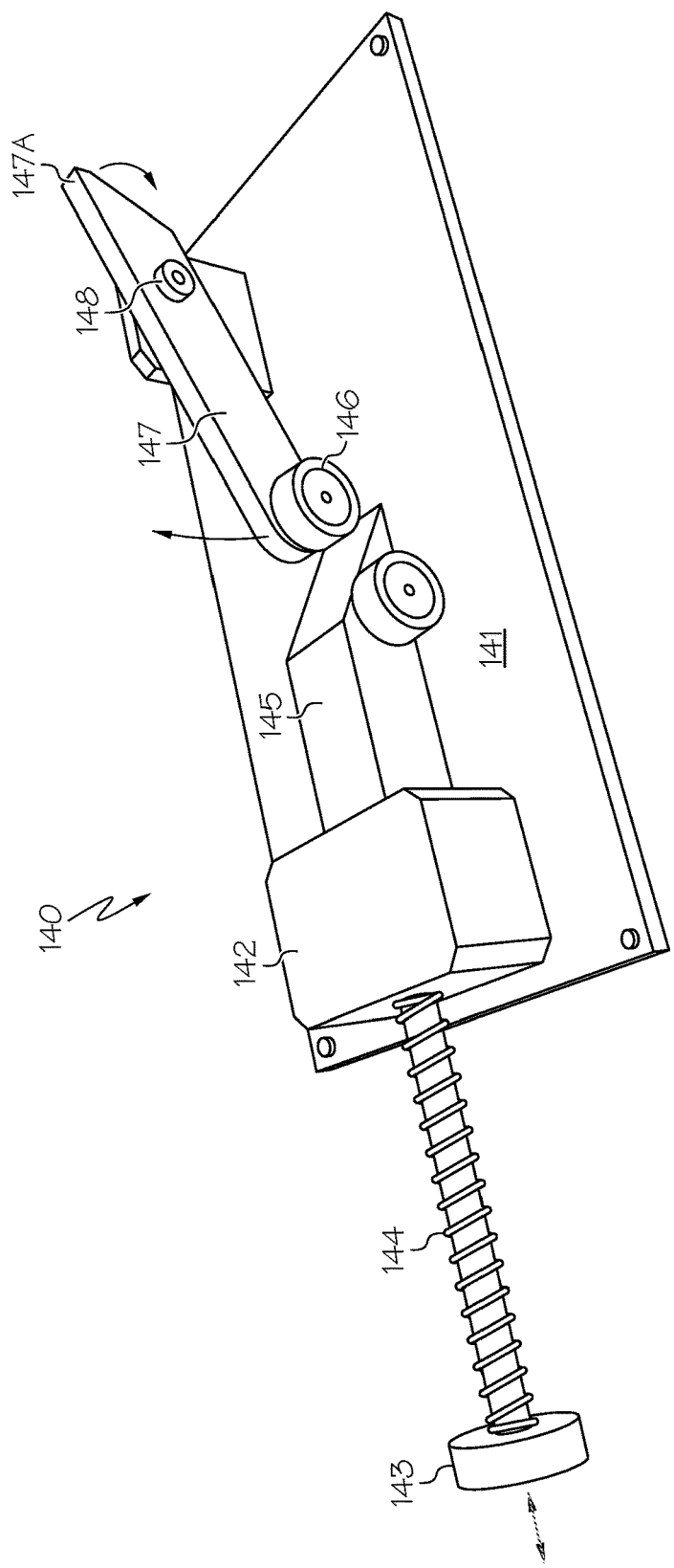
FIG. 3 depicts a second workpiece-securing device in accordance with one or more embodiments shown or described herein.

Referring next to FIG. 3, details of the second workpiece-securing device 140 are shown. In one form, the second workpiece-securing device 140 is mounted to the AGC 100 through a mounting plate 141, which in turn may be secured to the upper surface 110 of AGC 100. A housing 142 is secured to the mounting plate 141, and acts to receive therethrough the reciprocating translational movement of a shaft 143 (presently shown with an enlarger plunger at one end). In one form, housing may include one or more bearing surfaces to promote the relatively free translational movement of the shaft 143. A spring 144 is disposed about the shaft 143 in order to provide a bias for a wedge 145 that is connected to an opposing end of the shaft 143 from the plunger. Such bias keeps the wedge 145 substantially disengaged from a roller 146 that is rotatably mounted to one end of a lever 147 that defines through a pivot 148 a generally "see-saw" type pivoting movement that allows for a continuous (i.e., full time) retention through a coil spring (not shown) that is disposed about the pivot 148.

This biasing action forces an uppermost portion 147A of the lever 147 to engage with the pallet 300 or workpiece in order to keep it in its intended location on the AGC 100 until either a manual override (such as by a mechanically-coupled handle or lever, not shown, but coupled to the lever 147 to effect the rotational movement shown in FIG. 3), or automatic override as discussed in conjunction with the mechanically-cooperative movement of the AGC 100 and conveyor 200, where such mechanically-cooperative movement may be either through the controller 500 or a geared, pullied or similar coupling that forms a part of AGC 100 and conveyor 200. In this latter form, such cooperation between the actuator 250, the second workpiece-securing device 140 and the pallet 300 corresponds to the mechanical movement of the conveyor 200, in particular how such movement performs a synchronized engagement and disengagement of the second workpiece-securing device 140 with the lip 340 or other suitable surface of pallet 300 or the workpiece. In either version, the second workpiece-securing device 140 can be made to be in a closed normal position that can only be changed to have it move out of the way when (a) the workpiece is being slid or otherwise placed onto the upper surface 110 that is defined on the top of the AGC 100, or (b) the workpiece is being slid or otherwise placed from the upper surface 110 that is defined on the top of the AGC 100 to the adjacent upper surface of the conveyor 200. Thus, the second workpiece-securing device 140 alternates between an unlocked position where the second retention is not provided and a locked position where the second retention is provided. Furthermore, the second workpiece-securing device 140 alternates between the unlocked position and the locked position through a combination of translational and rotational movement associated with the movement of the shaft 143, spring 144, wedge 145, roller 146, lever 147 and pivot 148.

In one form, at least some of parts making up the second workpiece-securing device 140 are made from structurally rigid, load-bearing materials; for example, at least the lever 147 may be made from steel or other material suitable for maintaining a secure retention between the second workpiece-securing device 140 and the pallet 300 or ICE 400. As will be discussed in conjunction with FIGS. 4A through 4C, in the locked position, an interference fit is formed between the second workpiece-securing device 140 and either a workpiece or (as shown) the lip 340 of pallet 300, while in an unlocked position, no interference fit is formed, permitting the free sliding movement of the pallet 300 or workpiece relative to the AGC 100. Furthermore, the cooperation between the second workpiece-securing device 140 and either a workpiece or (as shown) the lip 340 of pallet 300 is such that the movement of the second workpiece-securing device 140 takes place independently of the first workpiece-securing device 130.

Referring next to FIGS. 4A through 4C, a sequence of events showing details associated with how the second workpiece-securing device 140 cooperates with the AGC 100 and conveyor 200 to permit selective retention and removal of the pallet 300 is described. In particular, the sequence is described for the situation where a workpiece and pallet 300 go from being independently secured on opposing sides 100A, 100B of AGC 100 to being loaded onto conveyor 200. Although the present figures depict the presence of the pallet 300 as being directly engaged with the upper surface 110 of AGC 100, it will be appreciated that configurations where direct mounting of the ICE 400 or other workpiece is also within the scope of the present disclosure, and that the same general movement of the actuator 250 of conveyor 200 and the second workpiece-securing device 140 of the AGC 100 will be understood to still apply, assuming that the ICE 400 or other workpiece is configured with suitably-configured mounting locations thereon that can engage the actuator 250 and second workpiece-securing device 140 in a manner generally similar to that of pallet 300.

Referring with particularity to FIG. 4A, one form—due to mechanical interaction between the AGC 100 and conveyor 200—of automatic engagement and disengagement between a workpiece and the AGC 100 is shown. The pallet 300 (where the ICE 400 or other workpiece—as well as the guide rails 120 and first workpiece-securing device 130 that are each secured to the AGC 100—have been removed for visual clarity) is resting on upper surface 110 of AGC 100, while the actuator 250 has yet to engage the shaft 143 and plunger of the second workpiece-securing device 140. In this position, the uppermost portion 147A of lever 147 forms an interference fit with the corresponding lip 340 of pallet 300 on the right side. The spring bias made possible by the coil spring on the pivot 148 of the second workpiece-securing device 140 keeps the uppermost portion 147A of lever 147 in its engaged position through angle θ. This bias has the effect of keeping the second workpiece-securing device 140 biased in the locked position due to the interference fit. In this way, the spring bias due to the coil spring on the pivot 148 of the second workpiece-securing device 140 can force the second retention device to snap back into place to form a locking fit arrangement. This in turn helps prevent an inadvertent sliding off of the pallet 300 along the side 100B that abuts the proximal end of the conveyor 200 (shown presently as the left side of AGC 100) during the time where the AGC 100 is adjacent the conveyor 200, as well as when subsequent AGC 100 transport takes place. As such, the second workpiece-securing device 140 acts as a means for securing the pallet 300 or workpiece on one side 100B of AGC 100 while the first workpiece-securing device 130 acts as a means for securing the pallet 300 or workpiece on one he opposing side 100A of AGC 100, where each workpiece-securing device 130, 140 operates independently of the other.

Referring with particularity to FIG. 4B, an automated form of disengaging the second workpiece-securing device 140 from the pallet 300 then commences. In particular, rightward movement of the actuator 250 in response to either mechanical linkage-based movement of the conveyor 200 or from the controller 500 causes resultant translational rightward movement of the shaft 143 in order to overcome the leftward bias of spring 144; this in turn causes the wedge 145 to move rightward so that it begins to engage with the roller 146. Consequently, the rigid coupling between roller 146 and lever 147 causes the lever 147 to begin to rotate in a clockwise direction as shown until the roller 146 comes to rest on a plateaued portion of wedge 145; the height of the roller 146 on this plateaued portion is such that the lever 147 is now in a generally horizontal position, as is its uppermost portion 147A such that it has now moved out of the interference fit with lip 340 at the right side of the pallet 300. This in turn disengages the pallet 300 from the second workpiece-securing device 140 such that the second workpiece-securing device 140 goes from a locked to an unlocked position. At this time, the only loads preventing movement of the pallet 300 relative to the AGC 100 is the vertically-upward support along the Y-axis, as well as the concomitant frictional forces along the orthogonal X-axis and Z-axis due to the contact of the bottom surface of pallet 300 and the upper surface 110 of AGC 100 or its guide rails 120.

In one form, a vertically-upstanding hook 260 forms a wedge-shaped top termination of actuator 250. In one form, this hook 260 device may be spring-loaded so that once the actuator 250 moves rightward underneath pallet 300 on its way to pushing against shaft 143 and overcoming the bias in spring 144, the weight of the pallet 300 (as well as any workpiece disposed thereon) is sufficient to push the hook 260 downward in order to allow passage of the actuator 250 rightward. Once the hook 260 has cleared the lower surface of the left-most part of pallet 300, the spring forces the hook 260 upward into a portion of the space in the pallet 300 that corresponds to the aperture 320. In such operation, the selective engagement and disengagement of the second workpiece-securing device 140 with the pallet 300 is deemed to be part of the mechanically-cooperative automated process. In an alternate form, the movement of one or both of the actuator 250 and the second workpiece-securing device 140 may be made in response to signals from the controller 500, such as through additional actuators, motors or other devices (none of which are shown). In yet another form (and as mentioned elsewhere in this disclosure), the movement of the second workpiece-securing device 140 may be made to take place between a locked and an unlocked position by manual actuation, such as through an operator-engaged lever (not shown) that is coupled to the second workpiece-securing device 140 in general and—in one form—to the lever 147 directly. It will be deemed that all three variants—one manual, one controller-based automated and one mechanically-cooperative—are within the scope of the present disclosure.

Referring with particularity to FIG. 4C, leftward movement of the actuator 250 takes place until the hook 260—which has since returned into its normal or raised position—engages the lip 340 that is formed on the leftmost portion of the aperture 320 that is formed in pallet 300. At this time, the second workpiece-securing device 140 effectively "hands-off" the pallet 300 to the conveyor 200 through the leftward pulling motion of actuator 250 as it cooperates with the lip 340. Simultaneously, the rightmost edge of pallet 300 clears the uppermost portion 147A of lever 147 while the decoupling of the actuator 250 from the shaft 143 takes place in order to permit spring 144 to move the shaft 143 and connected wedge 145 out of the way of roller 146 so that the spring bias on the pivot 148 forces the lever 147 to rotate counterclockwise such that the uppermost portion 147A of lever 147 is back to its normal (that is to say, locked) position, thereby making it ready to receive another pallet 300 being delivered from conveyor 200. By this operation, the pallet 300 (as well as any workpiece such as ICE 400 disposed thereon) may be safely unloaded from AGC 100 onto conveyor 200. Likewise, the opposing operation where the pallet 300 and workpiece are being loaded onto AGC 100 from conveyor 200 may be performed in a similar manner to that described herein.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. For example, the system and methods using the system may be implemented in one or both of software and hardware, and that all variations on the embodiments of such system and method as discussed herein will be understood to be within the scope of the present disclosure. Furthermore, the order of steps associated with such methods may be changed, while various features of the system may be combined, added, removed, reordered, modified or the like, and still be within the scope of the present disclosure. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A workpiece transport assembly comprising:
  an automated guided cart comprising a motorized chassis with an upper workpiece-receiving surface for slidable receipt and removal of a workpiece along a conveying direction; and a workpiece-securing device mounted to the cart and cooperative with the upper workpiece-receiving surface to selectively inhibit transport of a workpiece to or from the workpiece transport assembly, the workpiece-securing device comprising:
- a first workpiece-securing device cooperative with the upper workpiece-receiving surface to selectively permit a first retention of a workpiece disposed thereon along the conveying direction; and
- a second workpiece-securing device cooperative with the upper workpiece-receiving surface to selectively permit a second retention of a workpiece disposed thereon along the conveying direction such that the first and second workpiece-securing devices operate in a redundant way to retain a workpiece on the upper workpiece-receiving surface, where the second workpiece-securing device is actuated independently of the first workpiece-securing device.

2. The assembly of claim 1, wherein the second workpiece-securing device alternates between an unlocked position where the second retention is not provided and a locked position where the second retention is provided.

3. The assembly of claim 2, wherein the second workpiece-securing device alternates between the unlocked position and the locked position through a combination of translational and rotational movement within the second workpiece-securing device such that in the locked position, an interference fit is formed between the second workpiece-securing device and a workpiece, while in an unlocked position, no interference fit is formed between the second workpiece-securing device and a workpiece.

4. The assembly of claim 3, wherein the second workpiece-securing device comprises a spring-biased shaft and a pivoting lever cooperative with one another such that translational movement of the spring-biased shaft is selectively engageable with the pivoting lever such that movement of the spring-biased shaft along a loading axis of a workpiece imparts selective rotational movement of the pivoting lever between the locked and unlocked positions.

5. The assembly of claim 4, wherein the second workpiece-securing device is biased in the locked position.

6. The assembly of claim 5, wherein the second workpiece-securing device operates between the locked and an unlocked position by automated actuation.

7. The assembly of claim 6, further comprising a controller cooperative with the second workpiece-securing device to effect the automated actuation.

8. The assembly of claim 5, wherein the second workpiece-securing device operates between a locked and an unlocked position by manual actuation.

9. The assembly of claim 1, further comprising:
- at least one guide disposed on the workpiece-receiving surface; and
- a pallet in selective sliding cooperation with at least one of the workpiece-receiving surface and the at least one guide such that a workpiece is disposed on the workpiece-receiving surface through the pallet and at least one guide.

10. The assembly of claim 9, wherein the locked position of the second workpiece-securing device forms an interference fit directly between the second workpiece-securing device and the pallet.

11. The assembly of claim 1, wherein the first and second workpiece-securing devices are disposed such that the first workpiece-securing device is configured to prevent inadvertent release of the workpiece from one side of the cart while the second workpiece-securing device is configured to prevent inadvertent release of the workpiece from a substantially opposing side of the cart.

12. A material handling assembly comprising:
- a conveyor defining proximal end and a distal end such that a workpiece disposed on a surface of the conveyor is transported between the proximal and distal ends; and
- a workpiece transport assembly comprising:
  - an automated guided cart comprising a motorized chassis with an upper workpiece-receiving surface for slidable receipt and removal of a workpiece along a conveying direction; and
  - a workpiece-securing device mounted to the cart and cooperative with the upper workpiece-receiving surface to selectively inhibit transport of a workpiece to or from the workpiece transport assembly, the workpiece-securing device comprising:
    - a first workpiece-securing device cooperative with the workpiece-receiving surface to selectively permit a first retention of a workpiece disposed thereon along the conveying direction; and
    - a second workpiece-securing device cooperative with the upper workpiece-receiving surface to selectively permit a second retention of a workpiece disposed thereon along the conveying direction such that the first and second workpiece-securing devices operate in a redundant way to retain a workpiece on the upper workpiece-receiving surface, where the second workpiece-securing device is actuated independently of the first workpiece-securing device.

13. The assembly of claim 12, wherein the conveyor comprises an actuator that is selectively engageable with the second workpiece-securing device through translational movement along a loading axis of a workpiece.

14. The assembly of claim 13, further comprising a controller such that movement of the actuator is automated in response signals from the controller.

15. The assembly of claim 13, wherein movement of the actuator is automated in response to mechanical movement of the conveyor.

16. A method of operating a cart within a material handling environment, the method comprising:
- placing the cart adjacent a conveyor;
- slidably moving a workpiece situated on one of the cart and conveyor to the other of the cart and conveyor along a conveying direction, the cart comprising a workpiece-securing device comprising a first workpiece-securing device and a second workpiece-securing device both of which are cooperative with a workpiece-receiving surface disposed on the cart to selectively and redundantly inhibit transport of a workpiece to or from the workpiece transport assembly along the conveying direction; and
- operating the second workpiece-securing device such that it selectively retains the workpiece on the workpiece-receiving surface independently of the first workpiece-securing device.

17. The method of claim 16, wherein the material handling environment comprises a vehicle manufacturing facility.

18. The method of claim 16, wherein the cart comprises an automated guided cart.

19. The method of claim 18, wherein an automated disengagement of the second workpiece-securing device takes place substantially simultaneously with removal of the workpiece from the cart to the conveyor.

20. The method of claim 16, wherein the workpiece comprises an internal combustion engine situated on a separable pallet, the pallet cooperative with the second workpiece-securing device such that an interference fit takes place directly between the second workpiece-securing device and the pallet during a period when the pallet and the internal combustion engine are retained on the cart.

\* \* \* \* \*